United States Patent

Nakayama

[11] 4,140,374
[45] Feb. 20, 1979

[54] OVERLAP PHOTOGRAPHING DEVICE FOR SOUND CINECAMERA

[75] Inventor: Yasuhiko Nakayama, Suwa, Japan
[73] Assignee: Chinon Industries Incorporation, Suwa, Japan
[21] Appl. No.: 827,858
[22] Filed: Aug. 26, 1977
[30] Foreign Application Priority Data
Oct. 26, 1976 [JP] Japan .............................. 51-128634
[51] Int. Cl.² ........................................... G03B 21/36
[52] U.S. Cl. ............................................... 352/91 C
[58] Field of Search ................... 352/91 R, 91 C, 91 S
[56] References Cited
U.S. PATENT DOCUMENTS

| | | | |
|---|---|---|---|
| 3,712,720 | 1/1973 | Winkler et al. | 352/91 C |
| 3,778,138 | 12/1973 | Iida | 352/91 S |
| 3,851,956 | 12/1974 | Komine | 352/91 C |
| 3,858,230 | 12/1974 | Miki | 352/91 S |
| 3,972,604 | 8/1976 | Yoshimura et al. | 352/91 C |

Primary Examiner—Monroe H. Hayes
Attorney, Agent, or Firm—Blanchard, Flynn, Thiel, Boutell & Tanis

[57] ABSTRACT

A sound cinecamera is provided with an intermittent film feeding motor, a continuous film driving means for sound recording, an operating means, a plurality of switch means which is operated by said operating means so as to control the ON and OFF as well as the driving direction of said film feeding motor, and a controlling means which is connected with said film feeding motor by said operating means so as to be driven in concert with said motor and controls an overlapping operation in co-operation with said switch means.

1 Claim, 7 Drawing Figures

OVERLAP PHOTOGRAPHING DEVICE FOR SOUND CINECAMERA

BACKGROUND OF THE INVENTION

The present invention relates to an overlap photographing device for a sound cinecamera.

When an overlap photographing is effected by means of a silent cinecamera it can be done only be reversing the rotation of a film feeding motor, because in this case there is nothing to do beyond the overlapping of the pictures. In contrast, when an overlap photographing is effected by means of a sound cinecamera there arises the further necessity of doing the overlapping of sounds. In this case, there must be controlled not only the reverse rotation of said film feeding motor but also the rotation of a capstan driving motor for the purpose of continuously feeding film in overlap sound recording.

The conventional sound cinecameras were defective in that the structure and/or operation, by which a film feeding motor and a capstan driving motor are controlled so that they may be mutually maintained under a predetermined relation in overlapping, are extremely complicated.

SUMMARY OF THE INVENTION

One object of the present invention is to provide an overlap photographing device for a sound cinecamera which has eliminated the drawbacks inherent to the conventional ones.

Another object of the present invention is to provide an overlap photographing device for a sound cinecamera which is easy to operate and is comparatively simple in its structure.

A further object of the present invention is to provide an overlap photographing device for a sound cinecamera wherein a plurality of switch means which act for controlling an intermittent film feeding motor and a controlling means which co-operates with said plurality of switch means so as to control an overlapping operation are designed to be operated by means of an operating means.

A still further object of the present invention is to provide an overlap photographing device for a sound cinecamera wherein a pinch roller is designed to be separated from a capstan for sound recording by means of said operating means at the time of film reverse-winding in overlapping, thereby relieving said capstan of its continuous film feeding operation.

Another object of the present invention is to provide an overlap photographing device for sound cinecamera wherein said controlling means comprises an integrally assembled plurality of cam means which are connected with said film feeding motor by means of said operating means and driven by said motor so as to effect the overlapping operations at an interval of one rotation of said plurality of cam means.

DETAILED DESCRIPTION OF THE INVENTION

Figure 1:
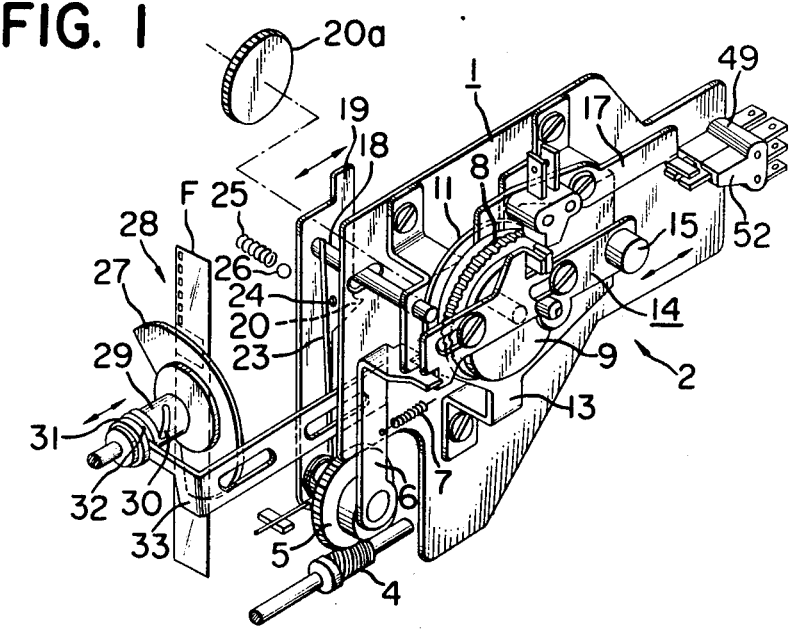
FIG. 1 is a perspective view particularly illustrative of the controlling mechanism and the shutter mechanism of an preferred embodiment of the overlap photographing device for a sound cinecamera according to the present invention.
Figure 2:
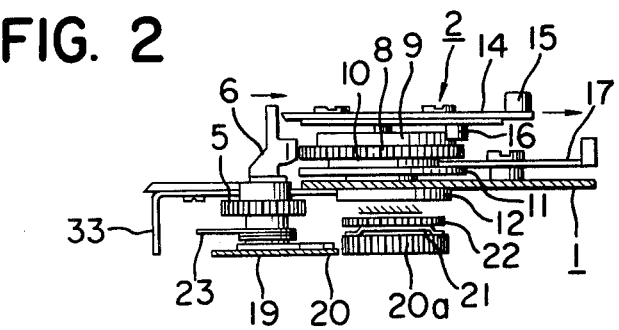
FIG. 2 is a plan view illustrative of the base of the controlling mechanism as shown in FIG. 1.
Figure 4:
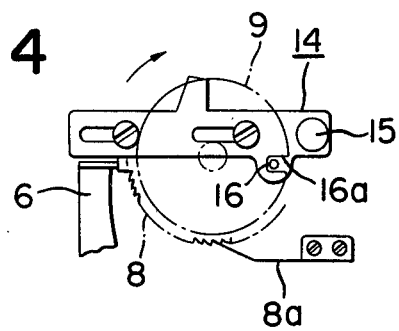
FIG. 4 is a front view illustrative of the set cam in the controlling mechanism as shown in FIGS. 1 and 2.

Referring to FIG. 1 and FIG. 2, the reference numeral 1 denotes a base plate. A controlling mechanism 2 for the purpose of controlling each operation in overlapping is installed on said base plate. This controlling mechanism 2 is a counter mechanism for the purpose of setting the time for each operation of fade-out, film reverse-winding and fade-in in overlapping. This controlling mechanism 2 comprises a worm 4 driven by an intermittent film feeding motor 3, a worm wheel 5 which engages with said worm 4, a ratchet pawl 6 whose base is rotatably and eccentrically fixed to the side of said worm wheel 5, a ratchet wheel 8 toward the circumference of which said ratchet pawl 6 is biased by means of a coil spring 7 and a plurality of cam means consisting of a set cam 9, a switch cam 10, a change-over cam 11 and a fade cam 12 which are integrally fitted to said ratchet wheel 8. On said base plate 1 is installed a lever fixing plate 13, on said lever fixing plate 13 is equipped a horizontally movable set lever 14 biased leftward in FIGS. 1 and 4, one end of said set lever 14 is engaged with the tip of the ratchet pawl 6 and on the other end of the same lever 14 is provided a set lever button 15 for moving the lever 14 forward and backward. In FIG. 4, the reference numeral 8a denotes a holdfast for the ratchet wheel.

Referring to FIG. 4, the set cam 9 in said plurality of cam means is for the purpose of starting as well as finishing the overlapping, and is provided with a recess 16a designed to be engageable with a set pin 16 projecting from the inner side of the set lever 14. Accordingly, the set cam 9 is designed to be co-operated with the set lever 14 such that at the time of starting the overlapping, said set pin 16 is pulled out of the recess 16' by displacing the set lever 14 rightwards in FIG. 4, thereby enabling the ratchet wheel 8 and the plurality of cam means to move, while at the time of finishing the overlapping, the set lever 14 goes back to the initial leftward position so as to let the set pin 16 go in the recess 16' thereby bringing the ratchet wheel 8 and the plurality of cam means to a halt.

Figure 5:
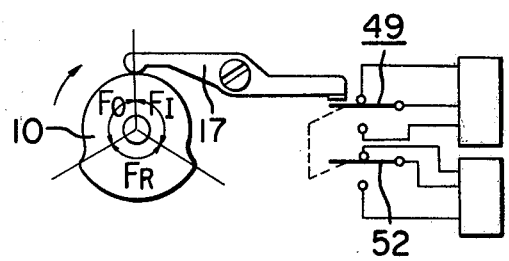
FIG. 5 is a front view illustrative of the switch cam in the controlling mechanism.

Referring to FIG. 5, the switch cam 10 in the plurality of cam means comprises smaller diameter portions (FO) and (FI) practically equivalent to 120° respectively corresponding to fade-out and fade-in for the overlapping and a larger diameter portion (FR) practically equivalent to 120° corresponding to film reverse-winding for the overlapping, and is designed to make a switch lever 17 work according to the angle of rotation of said switch cam 10, said switch lever being biased so as to make its fore end contact with the circumference of the switch cam 10.

Figure 6:
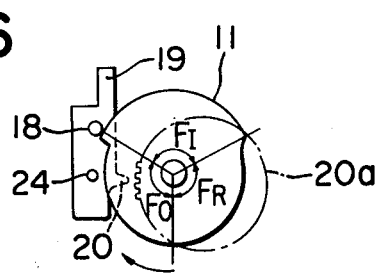
FIG. 6 is a front view illustrative of the change-over cam in the controlling mechanism.

Referring to FIG. 6, the change-over cam 11 in the plurality of cam means comprises smaller diameter portions (FO) and (FR) practically equivalent to 120° respectively corresponding to fade-out and film reverse-winding for the overlapping and a larger diameter portion (FI) practically equivalent to 120° corresponding to fade-in for the overlapping, and is for the purpose of operating a change-over lever 19 through a pin 18. This change-over lever 19 is biased by means of a spring 23 (FIGS. 1 and 2) so as to make its projection 20 engage with the tooth groove of a film-winding stop gear 20a imparted with a turning effort from a film-winding drive gear 22 through a friction spring 21 (FIG. 2). In the overlapping for sound photographing, an engagement hole 24 (FIG. 1) bored in the change-over lever 19 is engaged with a ball 26 as pressure-biased by means of a coil spring 25, whereby the aforesaid projection 20 and film-winding stop gear 20a are kept apart in spite of the movement of the change-over cam 11, and in the overlapping for silent photographing, the change-over lever 19 is moved to release the engagement between said engagement hole 24 and ball 26, said pin 18 is dropped on the smaller diameter portions (FO) and (FR) of the change-over cam 11 and, at the same time, the film-winding stop gear 20a is engaged with the projection 20 to bring the winding shaft to a halt. Thus bringing the winding shaft to a halt at the time of fade-out and film reverse-winding in the overlapping for silent photographing is for the purpose of storing the film F in the fore chamber of a film cartridge without winding it up at the stage of fade-out, thereby making it possible to perform reverse-winding by the length of film thus stored.

Figure 7:
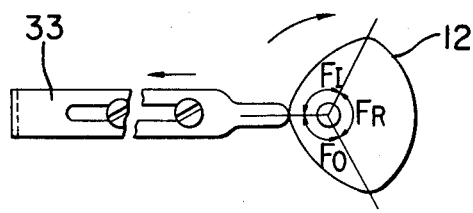
FIG. 7 is a front view illustrative of the fade cam in the controlling mechanism.

The fade cam 12 (FIG. 7) in the plurality of cam means is for the purpose of controlling the angular aperture of a shutter sector 27 (FIG. 1). This shutter sector 27 is an element constituting a shutter mechanism 28. This shutter mechanism 28 comprises a variable shaft 29 which interlocks with the film feeding motor 3 and is provided with the shutter sector 27, a variable ring 31 which is designed to slide as well as turn axially along a guide groove 30 provided aslant on said variable shaft 29 and a variable lever 33 whose tip is fitted to the annular groove 32 of said variable ring 31 and whose rear end is biased to the circumference of the fade cam 12, wherein the fade cam 12 presses the variable lever 33 at its rear end so as to move it, thereby controlling the aperture of the shutter sector 27. The fade cam 12 comprises a gradually enlarged diameter portion (FO) corresponding to fade-out for the overlapping, a constant diameter portion (FR) corresponding to film reverse-winding for the overlapping and a gradually diminished diameter portion (FI), each portion being formed practically equivalent to 120° of the circumference of said fade cam, whereby as stated above by the action of the variable lever 33 as biased toward the outer circumference of this fade cam 12 the aperture of the shutter sector 27 is gradually narrowed in the fade-out, and is gradually widened in the fade-in.

Figure 3:
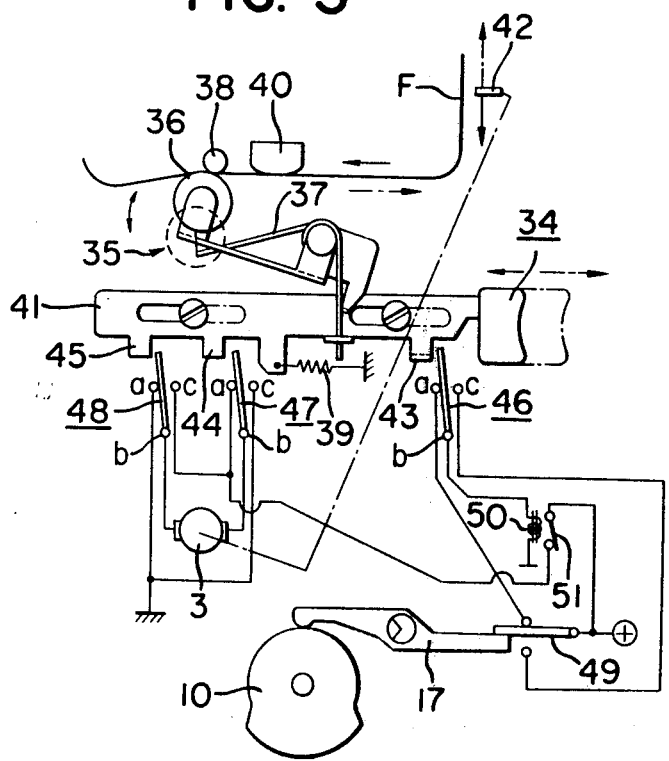
FIG. 3 is a schematic front view particularly illustrative of the continuous film driving means and the power circuit of the film feeding motor of an example of the overlap photographing device for a sound cinecamera according to the present invention.

In FIG. 3 the reference numeral 34 denotes a shutter button. When this shutter button 34 is pressed, a pinch roller 36 of the continuous feed mechanism 35 disposed above a shutter lever 41 in the drawing is biased toward a capstan 38 by means of a pressure-welded spring 37 for pinch roller, and when said button 34 is released, said shutter lever 41 is pulled back by means of a spring 39 to thereby pull the pinch roller 36 apart from said capstan 38. In FIG. 3, the reference numeral 40 denotes a sound-recording head, and the reference numeral 42 denotes a feed pawl for film F to be driven by the film feeding motor 3.

In FIG. 3, further, a plurality of switch means consisting of change-over switches 46, 47 and 48 are provided in a manner of corresponding to engagement members 43, 44 and 45 disposed beneath said shutter lever 41. The movable contact of each switch 46, 47 and 48 is biased leftward in the drawing so that when the shutter lever 41 is pushed to move leftward by pressig the shutter button 34 as illustrated in the drawing, the contacts a and b are connected, and when the shutter button 34 is released from the press, the contacts b and c are connected.

The change-over switch 46 functions to energize and disenergize an electromagnet 50 together with another change-over switch 49 to be operated by means of the aforesaid switch lever 17. This electromagnet 50 is for the purpose of actuating a switch 51 which switches ON and OFF the power circuit of the film feeding motor 3. This switch 51 actuates to connect said power circuit while the electromagnet 50 is in the state of being energized.

The change-over switches 47 and 48 are for the purpose of determining the rotary direction of the film feeding motor 3, and are designed such that when the shutter button 34 is being pressed as illustrated in FIG. 3, these switches provide a connection for normal rotation and when the shutter button 34 is restored to its former position, they provide a connection for reverse rotation.

Now, explanation will be made on the mode of operation of this example in the following.

In an ordinary sound photographing, only by pushing the shutter button 34 or the shutter lever 41 there can be brought on such a connection as illustrated in FIG. 3, whereby the film feeding motor 3 is set in normal rotation.

In order to start the overlapping, the set lever 14 is further slide rightwardly in FIGS. 1 and 4 while pressing the shutter button 34. Due to this, the engagement of the set pin 16 and the recess 16a of the set cam 9 is released, the ratchet pawl 6 is drawn by the coil spring 7 and engages with the ratchet wheel 8, and the ratchet wheel 8 and the plurality of cam means incorporated with said ratchet wheel 8 move by virtue of the reciprocating motion of the ratchet pawl 6, and consequently the fade-out operation starts. In this fade-out, by the action of the fade cam 12 the aperture of the shutter sector 27 is gradually narrowed.

When the plurality of cam means make one-third rotation and fade-out completes, the switch cam 10 actuates the change-over switch 49 through the switch lever 17, disenergizes the electromagnet 50, and cuts-off the power circuit of the motor 3 thereby to stop said motor 3.

Next, when the shutter button 34 is released from the press and the shutter lever 41 is restored to its former position, the change-over switches 46, 47 and 48 are switched, the electromagnet 50 is energized again and connection is effected for the sake of reverse rotation of the motor 3 to thereby starting the film reverse-winding operation. During this film reverse-winding, the pinch roller 36 is released from being biased toward the capstan 38.

Next, when the plurality of cam means make two-third rotation, the switch cam 10 actuates the change-over switch 49 again through the switch lever 17, disenergizes the electromagnet 50, and cuts-off the power circuit of the motor 3 to thereby stop the motor 3.

Next, when the shutter button 34 is pressed to thus push the shutter lever 41 to move, the change-over switches 46, 47 and 48 are switched again as illustrated in FIG. 3, the electromagnet 50 is energized and connection is effected for the sake of normal rotation of the motor 3, whereby the fade-in operation starts. In this fade-in, the aperture of the shutter sector 27 is gradually widened by the action of the fade cam 12.

When the plurality of cam means make further one-third rotation, namely make one rotation from the first, the set pin 16 of said set lever 14 engages with the recess 16a of the set cam 9 to thereby set the plurality of cam means and also let the set lever 14 slide leftward in FIG. 1, so that the engagement of the ratchet pawl 6 and the ratchet wheel 8 is released and thus the motion of the plurality of cam means comes to a halt.

In this way, with one rotation of the ratchet wheel 8 together with the plurality of cam means there can be effected every operation of fade-out, film reverse-winding and fade-in for the overlapping. In succession the completion of overlapping, thus, the conventional sound photographing comes to start.

As described above, the overlap photographing device for a sound cinecamera according to the present invention is devised so that by the action of the operating means the controlling means are operated the plurality of switch means which control the intermittent film feeding motor and the controlling means for controlling the overlapping operation which is co-operated with said plurality of switch means so as to control each operation in overlapping, whereby the operations for overlapping can be performed very easily.

This overlap photographing device is also devised so that by the action of said operating means the pinch roller is separated from the capstan at the time of film reverse-winding in the overlapping operation thereby to release the capstan from continuous film feeding, whereby the film reverse-winding can be performed very easily, eliminating the necessity of synchronizing a film feeding motor and a capstan driving motor.

In addition thereto, the overlap photographing device is devised so that said controlling means is provided with the plurality of cam means which are mutually assembled integrally, by the action of said operating means these cam means come to connect with said film feeding motor to be driven, and an overlap can be completed with one rotation of said plurality of cam means, whereby at the time of completion of one overlapping operation it is possible to complete the preparation for the next overlap, besides there is no possibility of unprepared motions such as time log between each of said plurality of cam means and so the overlapping operation can be carried out always with extreme precession.

Although particular preferred embodiments of the invention have been disclosed in detail for illustrative purpose, it will be recognized that variations or modifications of the above disclosed apparatuses, including the arrangement of parts, lie within the scope of the present invention.

What is claimed is:

1. In a sound-recording cinecamera having a reversible electric film-feeding motor and a continuous film-driving means associated with sound-recording means, an overlap photographing apparatus which comprises: electromagnetically operated power switch means for controlling supply of power for operating said motor; an electromagnet for operating said power switch means; an operating means actuable between a first position in which said motor operates to move the film in a normal advancing direction and a second position in which said motor operates to reverse the direction of movement of the film; first switch means connected in circuit between said power switch means and said motor and operable to control the direction of rotation of said motor, said first switch means being coupled for operation in response to actuation of said operating means from said first position to said second position, and vice versa; pinch roller means coupled for operation by said operating means so that in said first position of said operating means said pinch roller means presses the film against said film-driving means and in said second position of said operating means said pinch roller is out of contact with the film; second switch means coupled for operation by said operating means; third switch means; controlling means operated by said motor and connected for actuating said third switch means; said second and third switch means being connected between a power source and said electromagnet so that said electromagnet is operated in response to the positions of said second and third switches whereby reverse movement of said film is controlled by said operating means, said controlling means and said electromagnet.

* * * * *